United States Patent

Wilkinson

Patent Number: 4,484,236
Date of Patent: Nov. 20, 1984

[54] MAGNETIC TAPE RECORDING AND REPRODUCING ARRANGEMENTS

[75] Inventor: James H. Wilkinson, Tadley, Near Basingstoke, England

[73] Assignee: Sony Corporation, Tokyo, Japan

[21] Appl. No.: 442,265

[22] Filed: Nov. 17, 1982

[30] Foreign Application Priority Data

Nov. 20, 1981 [GB] United Kingdom ............... 8135045

[51] Int. Cl.$^3$ .............................................. G11B 5/52
[52] U.S. Cl. ................................. 360/10.3; 360/19.1; 360/64
[58] Field of Search .............. 358/312; 360/10.1, 10.2, 360/10.3, 18, 19.1, 21, 64

[56] References Cited

U.S. PATENT DOCUMENTS

| | | | |
|---|---|---|---|
| 3,333,063 | 7/1967 | Stratton | 360/64 |
| 4,139,871 | 2/1979 | Yoshida et al. | 360/64 |
| 4,197,562 | 4/1980 | Kikuya et al. | 360/10 |
| 4,426,666 | 1/1984 | Kobayashi et al. | 360/10.3 |

*Primary Examiner*—George G. Stellar
*Attorney, Agent, or Firm*—Lewis H. Eslinger; Alvin Sinderbrand

[57] ABSTRACT

A magnetic tape recording and reproducing arrangement comprising a rotary drum, helical scan digital video tape recorder including first and second head assemblies mounted diametrically on a rotary drum, the first head assembly including first and second heads having gaps of opposite azimuth angle, and third and fourth heads having gaps of opposite azimuth angle to the first and second heads respectively, the second head assembly including fifth and sixth heads having gaps of opposite azimuth angle, and seventh and eighth heads having gaps of opposite azimuth angle to the fifth and sixth heads respectively, tape guides to wrap a tape more than 180° around the drum, in a recording operation the first head assembly through the first and second heads and the second head assembly through the fifth and sixth heads alternately recording pairs of skew tracks on the tape such that the tracks alternate in azimuth angle, and each of the first, second, fifth and sixth heads recording video data in a track for substantially but not exceeding 180° of each complete rotation of the drum and vertical parity data in the track for some further part of each complete rotation of the drum, the further part lying wholly beyond 180°, replay amplifiers to derive respective reproduced signals from all the heads, multiplexers to distribute the reproduced signals to four output channels, and a control arrangement including a programmable read-only memory to control the multiplexers in dependence on whether the selected reproduction mode is the normal mode, a slow shuttle mode or a fast shuttle mode.

8 Claims, 7 Drawing Figures

MAGNETIC TAPE RECORDING AND REPRODUCING ARRANGEMENTS

BACKGROUND OF THE INVENTION

1. Field of the Invention

This invention relates to magnetic tape recording and reproducing arrangements, and more particularly to such arrangements including a rotary drum, helical scan digital video tape recorder (VTR).

2. Description of the Prior Art

Although the mechanical and timing tolerances are severe, it is now commonplace for a VTR to achieve excellent reproduction from a magnetic tape so long as the reproduction is in the normal mode, that is, at normal forward speed, that is at the same speed and in the same direction as was used for recording. It is, however, more difficult to achieve acceptably good reproduction at different speeds. Reproduction at different speeds is sometimes collectively referred to as stunt mode reproduction and includes the slow shuttle mode which generally comprises reproduction in both forward and reverse directions at speeds lower than the normal forward speed and also still-picture reproduction, and the fast shuttle mode which generally comprises reproduction in both forward and reverse directions at speeds higher than the normal forward speed; although the speed boundaries between these modes are variable and may even overlap. There are several problems with reproduction in stunt modes, but the basic problem is that the strict scanning correlation between reproducing heads and recorded tracks to be reproduced is lost. For example, in the fast shuttle mode a given reproducing head instead of scanning a single recording track from end to end may cross many tracks in a single scan across the magnetic tape. This means that the data reproduced from the tape is imperfect to a greater or lesser extent, and in consequence the quality of the reproduced television picture is degraded.

To counteract this it has been proposed to use so-called dynamic tracking. In this case each reproducing head is mounted on a electromechanical transducer, such as a bi-morph leaf made of piezoceramic material. The output of the reproducing head is sensed and a feedback loop applies potentials to the transducer to keep the head output at a maximum, in other words to cause the head to trace the recorded track accurately.

While dynamic tracking can give good results, it is not always convenient to use, it is somewhat complicated, and it is not very suitable for use with multiple-head head assemblies.

SUMMARY OF THE INVENTION

One object of the present invention is to provide a magnetic tape recording and reproducing arrangement having improved stunt mode reproduction.

Another object of the present invention is to provide a magnetic tape recording and reproducing arrangement with two head assemblies each comprising four magnetic transducer heads with two different azimuth angles, an output signal being derived in dependence on the reproduction mode and the qualities of the signals reproduced by the respective transducer heads.

According to the present invention there is provided a magnetic tape recording and reproducing arrangement comprising:

a rotary drum, helical scan digital video tape recorder including:

first and second head assemblies mounted diametrically opposite one another on a rotary drum;

said first head assembly including first and second magnetic transducer heads having respective transducer gaps of opposite azimuth angle, and third and fourth magnetic transducer heads having respective transducer gaps of opposite azimuth angle to said first and second heads respectively;

said second head assembly including fifth and sixth magnetic transducer heads having respective transducer gaps of opposite azimuth angle, and seventh and eighth magnetic transducer heads having respective transducer gaps of opposite azimuth angle to said fifth and sixth heads respectively; and tape guide means to wrap a magnetic tape more than 180° around said drum; in recording operations said first head assembly through said first and second heads and said second head assembly through said fifth and sixth heads alternately recording pairs of skew tracks on said tape such that said tracks alternate in azimuth angle, and each of said first, second, fifth and sixth heads recording video data in a said track for not more than 180° of each complete rotation of the drum and further data in said track for some further part of each complete rotation of the drum, said further part lying wholly beyond said video data;

means to derive respective reproduced signals from all said heads;

multiplexer means to distribute said reproduced signals to four output channels; and control means to control said multiplexer means in dependence on a selected reproduction mode;

in a normal reproduction mode said control means controlling said multiplexer means to distribute the reproduced signals comprising said video and further data from said first, second, fifth and sixth heads to said four channels respectively;

in a slow shuttle mode said control means controlling said multiplexer means to distribute the reproduced signals comprising only said video data from said first or second, said third or fourth, said fifth or sixth and said seventh or eighth heads to said four channels respectively during the intervals when one only of said head assemblies is reading said video data, and during intervals when one of said head assemblies is reading said video data and the other of said head assemblies in reading said further data, said control means controlling said multiplexer means to pass the reproduced said video data from said one head assembly to two of said channels and to pass the reproduced said further data from said other head assembly to the other two of said channels; and in a fast shuttle mode said control means controlling said multiplexer means to distribute the reproduced signals comprising said video data only from said first or second, said third or fourth, said fifth or sixth and said seventh or eighth heads to said four channels respectively.

The above, and other objects, features and advantages of this invention will be apparent from the following detailed description of illustrative embodiments which is to be read in connection with the accompanying drawings.

DESCRIPTION OF THE PREFERRED EMBODIMENTS

The recording and reproducing arrangement to be described is a rotary drum, helical scan digital video tape recorder (VTR) and while the description which follows is mainly concerned with the reproduction function, it is necessary first to consider the recording function, as this determines the format of the recorded information on the magnetic tape and hence determines some aspects of how it is reproduced.

Figure 1:
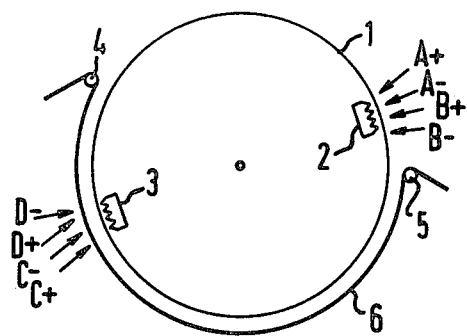
FIG. 1 is a diagrammatic axial view of a head drum of a VTR.
Figure 2:
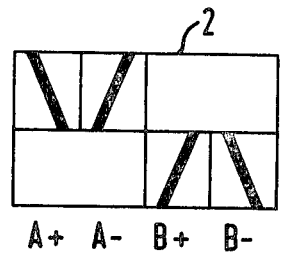
FIG. 2 shows the transducer gaps of the magnetic transducing heads of a head assembly of the head drum of FIG. 1.

FIG. 1 is an axial view of a head drum 1 of the VTR which is rotated at 150 Hz (for a 25 frames per second television system) and carries two similar head assemblies 2 and 3 mounted diametrically opposite to one another. The head assembly 2 comprises four magnetic transducing heads A+, A−, B+ and B−, while the head assembly 3 comprises four magnetic transducing heads C+, C−, D+ and D−. Associated with the head drum 1 are two tape guides 4 and 5 which are positioned such that a magnetic tape 6 contacts the head drum 1 over an angular distance of approximately 220°. During recording, each transit of each of the head assemblies 2 and 3 in contact with the tape 6 results in recording of two skew tracks on the tape 1. In the case of the head assembly 2 the tracks are recorded by the heads A+ and B+, and in the case of the head assembly 3 the tracks are recorded by the heads C+ and D+, in that order. The transducer gaps of the heads A+ and C+ have the same azimuth angle which is oppositely disposed to the azimuth angle of the transducer gaps of the heads B+ and D+. In consequence, adjacent tracks are recorded with opposite azimuth angles, and no guard bands, or at least only narrow guard bands, are required between adjacent tracks. The azimuth angles of the transducer gaps of the heads A−, B−, C− and D− are oppositely disposed to the azimuth angles of the transducer gaps of the heads A+, B+, C+ and D+, respectively. FIG. 2 indicates the azimuth angles of the heads A+, A−, B+ and B− of the head assembly 2.

Figure 3:
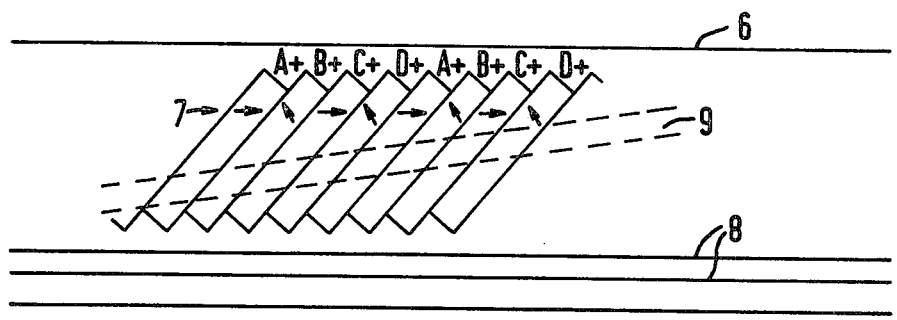
FIG. 3 shows a part of a pattern of recorded tracks on a magnetic tape.

FIG. 3 indicates the disposition of recorded skew tracks 7 on a part of the tape 6. Eight successive tracks 7 are shown and it is assumed that there are no guard bands. The letters alongside the tracks 7 indicate which of the heads recorded the respective track 7 and the arrows on the tracks 7 indicate the azimuth angle of the recording head. In addition, the tape 6 will generally carry some longitudinal tracks 8 extending adjacent to one edge of the tape 6; one for control signals and at least one for audio or cue signals.

When the tape 6 is reproduced at normal speed the tracks 7 are reproduced sequentially, each track 7 being scanned and reproduced once only by a head having the same azimuth angle as the head which recorded it. Thus the tracks 7 recorded by the head A+ are reproduced by the head A+ or alternatively by the head C+. The tracks 7 recorded by the head B+ are reproduced by the head B+ or alternatively by the head D+, and so on.

When the tape 6 is reproduced at a speed other than the normal speed, this one-to-one scanning correlation between the reproducing heads and the tracks 7 is lost. For example, in the case of a high speed reproduction a given reproducing head may scan across several tracks 7 as indicated by the trace 9 in FIG. 3. This results in difficulties of data handling in reproduction and in deterioration of the quality of reproduced pictures, but before considering this aspect in more detail, it is necessary to consider the content of each track 7.

Figure 4:
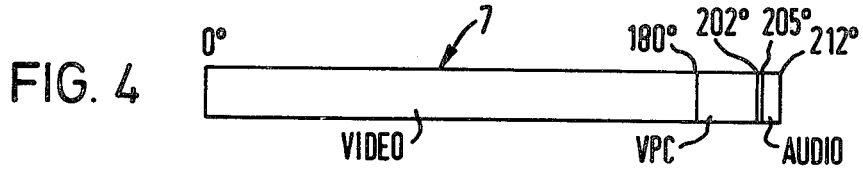
FIG. 4 indicates the arrangement of the data recorded in a single track on the magnetic tape.

FIG. 4 shows a single track 7. The data recorded therein comprises video data, vertical parity check (VPC) data and audio data, respectively designated VIDEO, VPC and AUDIO in the figure. As each head records a track 7 the video data is recorded first over an angular range of movement of the head of substantially 180°, and not more than 180°, say from 0° to 180°. The VPC data is recorded next from about 180° to 202°, and the audio data is recorded last from about 205° to about 215°. Because the video data is confined to 180° (or slightly less) and the head assemblies 3 and 4 are disposed diametrically, this means that at any given time only one of the head assemblies 3 and 4 is recording (or reproducing) video data.

For recording, an input television signal is sampled and then analog-to-digitally converted, generally using pulse code modulation with one 8-bit word per sample, although 8-bit word to 10-bit word coding may then be used to provide a signal more suited to magnetic recording and reproduction, and to provide for some error detection. The video data in each track 7 corresponds to one so-called segment of a field, that is 49 horizonal lines. In a 625-line television system 294 active lines per field are recorded, so six tracks 7 comprise one field. This corresponds to rotation of the head drum 1 at 150 Hz, with four tracks 7 recorded per rotation. The VPC data comprises vertical parity check words corresponding to the segment recorded in the same track 7 and, at least during reproduction at normal speed, provide for some error detection and correction.

Figure 5:
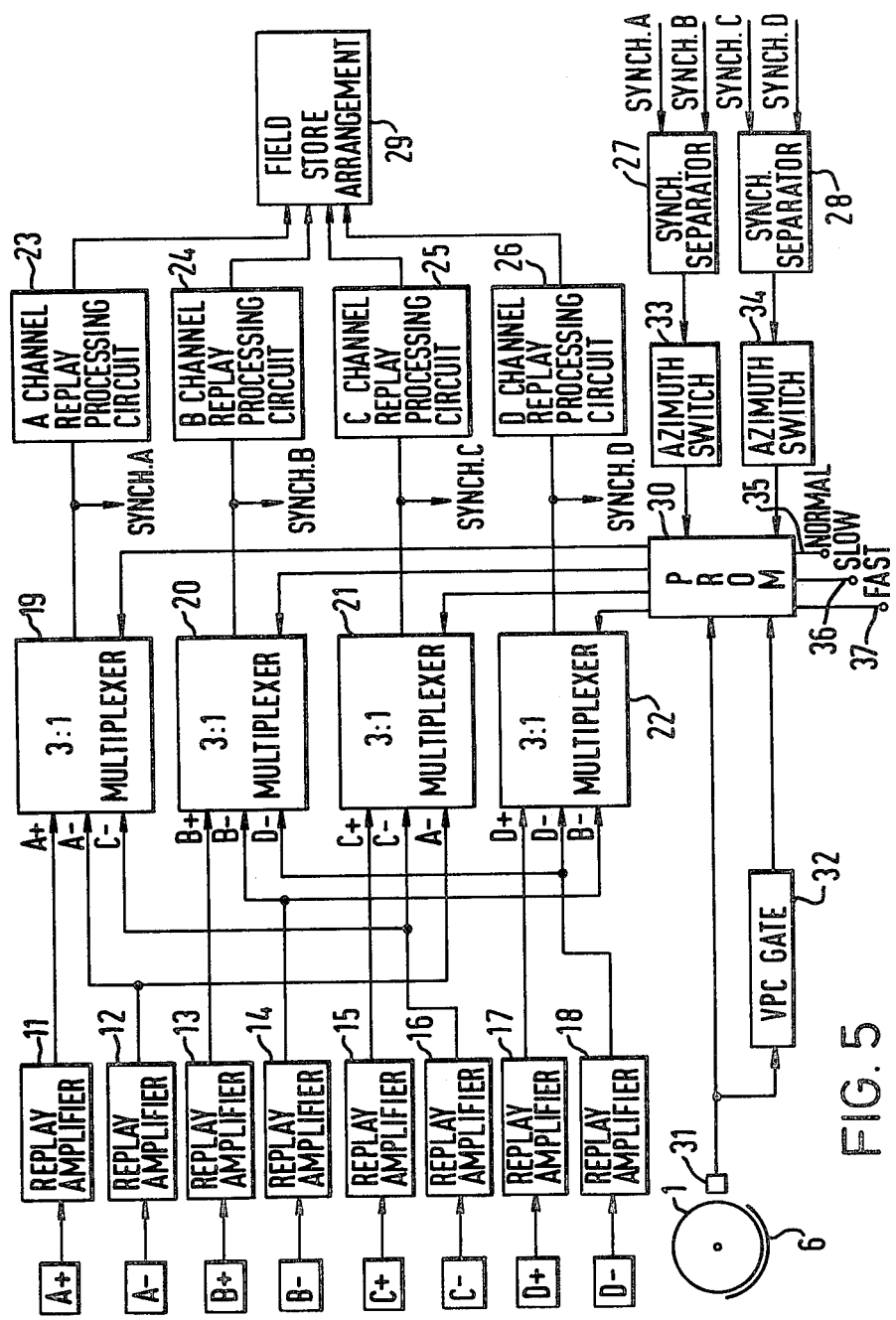
FIG. 5 is a block diagram of an embodiment of magnetic tape recording and reproducing arrangement according to the invention.

Reference is now made to FIG. 5 for a description of that part of the recording and reproducing arrangement which is particularly concerned with reproduction, and the operation thereof. In this figure the heads A+, A−, B+ and B− of the head assembly 2, and the heads C+, C−, D+ and D− of the head assembly 3 are shown separately, and these eight heads are respectively connected to the inputs of eight replay amplifiers 11 to 18. Connected to the outputs of the replay amplifiers 11 to 18 are four 3:1 selectors or multiplexers 19 to 22. In detail; the outputs of the replay amplifiers 11, 13, 15 and 17 are connected to the inputs of the multiplexers 19, 20, 21 and 22, respectively, and the outputs of the replay amplifiers 12, 14, 16 and 18 are connected to the inputs of the multiplexers 19 and 21; 20 and 22; 19 and 21; and 20 and 22, respectively. The outputs of the multiplexers 19 to 22 are respectively connected to a channel A replay processing circuit 23, a channel B replay processing circuit 24, a channel C replay processing circuit 25 and a channel D replay processing circuit 26. In addition, the outputs of the multiplexers 19 and 20 are connected to synchronizing signal separator circuits 27, and the outputs of the multiplexers 21 and 22 are connected to synchronizing signal separator circuits 28.

Each of the multiplexers 19 to 22 has three inputs and only one output. As indicated in FIG. 5, the inputs to the multiplexer 19 correspond to the heads A+, A− and C−, the inputs to the multiplexer 20 correspond to the heads B+, B− and D−, the inputs to the multiplexer 21 correspond to the heads C+, C− and A−, and the inputs to the multiplexer 22 correspond to the heads D+, D− and B−. Signals are not present on all the inputs to all the multiplexers 19 to 23 all the time because the head assemblies 2 and 3 are alternately out of contact with the tape 6 for some 360° minus 220°, that is 140° of each rotation of the head drum 1. Moreover, even when a signal is present on a given input to a given multiplexer 19 to 23, the quality of the signal can lie anywhere in the range from useless to excellent depending on the accuracy with which the relevant head is tracing a track, and also whether that head and that track have the same azimuth angle.

Each of the multiplexers 19 to 22 is controlled so that at substantially all times it passes to its output and hence to the respective one of the A to D channel replay processing circuits 23 to 26, the best of the available inputs signals. The outputs of the A to D channel replay processing circuits 23 to 26 are connected to a field store arrangement 29. The remaining elements shown in FIG. 5 are primarily concerned with effecting this control.

Figure 6A:
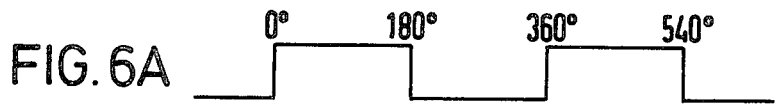
FIGS. 6A and 6B are waveforms used in explaining the operation of the arrangement of FIG. 5.
Figure 6B:

The control of the multiplexers 19 to 22 is actually carried out by a programmable read-only memory (PROM) 30, which has four control outputs respectively connected to the multiplexers 19 to 22. Associated with the head drum 1 is a drum phase signal generator 31, which may conveniently comprise a magnet fixed on the rotating head drum 1 and an associated fixed magnetic detector, and which supplies a square wave drum phase signal synchronized to the rotation of the head drum 1 and alternating between two levels at the 0° and 180° rotational positions of the head drum 1 (FIG. 6A). Moreover, the synchronization of this drum phase signal relative to the head assemblies 2 and 3 is such that one head assembly 2 or 3 first engages the tape 6 and starts to read signals at each 0° position, and the other head assembly 3 or 2 first engages the tape 6 and starts to read signals at each 180° position. The output of the drum phase signal generator 31 is supplied directly to the PROM 30 and also by way of a VPC gate 32 to the PROM 30. The VPC gate 32 derives from the drum phase signal a VPC gate pulse signal comprising pulses of duration approximately 16° starting at each 0° and 180° rotational position of the head drum 1 (FIG. 6B). Alternate pulses of the VPC pulse signal therefore coincide in duration and time position with the intervals during which the respective head assemblies 2 and 3 are reproducing the VPC data.

The synchronizing signal separator circuits 27 have outputs which are connected to an azimuth switch 33, the output of which is connected to the PROM 30. The synchronizing signal separator circuits 28 have outputs which are connected to an azimuth switch 34, the output of which is connected to the PROM 30.

Finally, the PROM 29 has three reproduction mode inputs 35, 36 and 37 corresponding respectively to normal play, slow shuttle and fast shuttle modes. The slow shuttle mode may cover reproduction from normal speed in the reverse direction through zero, that is still-picture reproduction, to normal speed in the forward direction, but in the present case will usually cover a somewhat wider range from roughly twice normal speed in the reverse direction to roughly twice normal speed in the forward direction. The fast shuttle mode covers reproduction at reverse and forward speeds outside, that is faster than, the range covered by the slow shuttle mode.

The operation will now be described.

The normal play mode will be considered first. Selection of the normal play mode causes a signal to be supplied by way of the input 35 to the PROM 30. The head drum 1 rotates at 150 Hz and the tape 6 is transported in the forward direction at the normal speed. The drum phase signal (FIG. 6A) and the VPC gate pulse signal (FIG. 6B) are supplied to the PROM 30.

The heads A+, B+, C+ and D+ each scan respective recorded tracks 7 with corresponding respective azimuth angles. The PROM 30 then controls the mutliplexers 19 to 22 so as respectively to supply outputs corresponding to the heads A+, B+, C+ and D+ to the A to D channel replay processing circuits 23 to 26 which effect error detection and correction in known manner using the VPC data, and separate the audio data if present. The outputs of the A to D channel replay processing circuits 23 to 26 are supplied to the field store arrangement 29 for assembly into complete fields of data and onward transmission. In this mode all the information recorded on the tape 6 should be reproduced substantially perfectly.

The slow shuttle mode will be considered next. Selection of the slow shuttle mode causes a signal to be supplied by way of the input 36 to the PROM 30. The head drum 1 rotates at 150 Hz and the tape 6 is transported in the reverse or the forward direction at low speed, or for still-picture reproduction is held stationary. Initially it is convenient to assume that the magnitude of the transport speed of the tape 6 in either direction does not exceed the magnitude of the transport speed of the tape 6 in normal reproduction. It then follows that every track 7 should be scanned at least once by a head; indeed at very low transport speeds every track 7 will be scanned many times.

In this mode, therefore, it is still possible to derive and use the VPC data for error detection and correction. However, no attempt is made to derive or use the audio signal (if recorded in the tracks 7), although an audio signal may be derived from a longitudinal track 8.

In this mode the drum phase signal and the VPC gate pulse signal are supplied to and used by the PROM 30, as are the outputs of the azimuth switches 33 and 34.

During reproduction of the video data and the VPC data, some azimuth switching is used. This switching is done between head pairs. Thus, if the head A+ appears to be reproducing a track 7 of the wrong azimuth, that is of the opposite azimuth angle to that of the head A+, then it is assumed that the head B+ is reproducing a track 7 of the wrong azimuth. Instead of using the outputs of the heads A+ and B+, therefore, the multiplexers 19 and 20 are both switched to select the outputs of the heads A− and B−.

Consider first the intervals during which only one of the head assemblies 2 and 3 engages the portion of the tape 6 where video data and VPC data are recorded. As these data together occupy the angular range 0° to approximately 202°, each head assembly 2 and 3 will be disengaged from this portion of the tape 6 for an interval of 360° minus 202°, that is 158°, of each complete rotation. During these intervals the PROM 30 controls the multiplexers 19 to 22 in dependence on the drum phase signal and the VPC gate pulse signal such that the outputs of the four heads of the head assembly 2 or 3 engaging the tape 6 are passed to the four A to D channel replay processors 23 to 26. For example, in one rotation of the head drum 1, from 22° to 180° the multiplexers 19 to 22 pass the signals corresponding to the heads A+, B+, A− and B−, respectively, and from 202° to 360° the multiplexers 19 to 22 pass the signals corresponding to the heads C+, C−, D+ and D−. At any given instant the signals passed into two of the four channels will be significantly better than the signals passed into the other two channels. The selection of the better signals is done by the A to D channel replay processing circuits 23 to 26, which supply outputs to the field store arrangement 29 where complete fields are assembled for onward transmission.

Consider now the intervals during which both the head assemblies 2 and 3 engage the portion of the tape where the video data and the VPC data are recorded. Because the video data occupies 180° this necessarily means that one head assembly 2 or 3 is just starting to read the video data and the other head assembly 3 or 2 is reading the VPC data. In dependence on the VPC gate pulse signal the PROM 30 controls the appropriate two of the multiplexers 19 to 22 to pass the VPC data, and the other two of the multiplexers 19 to 22 to pass the video data. Suppose the head assembly 2 is reading the video data and the head assembly 3 is reading the VPC data, then the PROM 30 initially controls the multiplexer 19 to 22 to pass the signals derived from the heads A+, B+, C+ and D+ respectively. However, there is the possibility, at relatively low speeds, that the heads A+ and B+ are reading tracks 7 recorded with the opposite azimuth angle. This is detected by the synchronizing signal separator circuits 27 which include phase locked loops which lock on the synchronizing signals in the video data. If these synchronizing signals are absent from both the A and B channels, the synchronizing signal separator circuits 27 supply a signal to the azimuth switch 33, whereby the PROM 30 controls the multiplexers 19 and 20 to pass the signals derived from the heads A− and B−. Both heads are switched because if one is on the wrong azimuth, then so also is the other. However, switching is only done when both heads lose synchronizing signals because a drop-out may cause loss of synchronising signals for one head but is unlikely to cause loss of synchronizing signals for both heads due to the physical displacement of the heads in the head assembly 2. Having switched, the switch condition is held until there is a further loss of synchronizing signals, or the head assembly 3 finishes reading the VPC data.

The VPC data is recorded with the same format as the video data, including synchronizing signals, and during these intervals during which the head assembly 2 is reading video data and the head assembly 3 is reading VPC data, the synchronizing signal separator circuits 28 likewise control the azimuth switch 34, whereby the PROM 30 controls the multiplexers 21 and 22 to pass the signals derived from the heads C+ and D+ or C− and D− to the field store arrangement 29 where complete fields are assemblies for onward transmission.

Although initially it was assumed that the magnitude of the transport speed of the tape 6 in either direction does not exceed the magnitude of the transport speed of the tape 6 in normal reproduction, the slow shuttle mode and the switching used therein may extend to higher speeds, for example, up to approximately twice the normal speed in the forward direction or in the reverse direction.

Finally, the fast shuttle mode will be considered. Selection of the fast shuttle mode causes a signal to be supplied by way of the input 37 to the PROM 30. The head drum 1 still rotates at 150 Hz, but the tape 6 is transported in the forward or the reverse direction at high speed, generally at least approximately twice the normal speed.

In this mode the heads will be crossing tracks 7 at high speed, as indicated by the trace 9 in FIG. 3 and will not therefore derive more than a fragment of the complete video data from any one track 7. No attempt is therefore made to derive or use the VPC data, as it would not even be clear to what video data particular VPC data correspond. Likewise, no attempt is made to derive or use the audio signal (if recorded in the tracks 7), although an audio signal may be derived from a longitudinal track 8.

In this mode, therefore, the drum phase signal is supplied to and used by the PROM 30, but all the other inputs to the PROM 30, except for the fast shuttle mode selection signal from the input 37 are in effect disabled. At any time one, and one only of the head assembles 2 and 3, engages with a portion of the tape 6 where video data are recorded and the drum phase signal indicates which of the head assemblies 2 and 3 it is. The PROM 30 controls the multiplexers 19 to 22 in dependence on the drum phase signal such that the outputs from the four heads of the head assembly 2 or 3 engaging the tape 6 are passed to the four A to D channel replay processing circuits 23 to 26. For example, in a first 180° the multiplexers 19 to 22 pass the signals corresponding to the heads A+, B+, A− and B−, respectively, in the next 180° the multiplexers 19 to 22 pass the signals corresponding to the heads C−, D−, C+ and D+, respectively, and this alteration then repeats.

What this means is that attempts are made to read the fragments of the tracks 7 with heads of both azimuths and thus at any given instant the signals passed into two of the four channels will be significantly better than the signals passed into the other two channels. The selection of the better signals is done by the A to D channel replay processing circuits 23 to 26, which supply outputs to the field store arrangement 29 where complete fields or, particularly at high shuttle speeds, fields which are as complete as the available input data permits, are assembled for onward transmission.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A magnetic tape recording and reproducing arrangement comprising: a rotary drum, helical scan digital video tape recorder including:

first and second head assemblies mounted diametrically opposite one another on a rotary drum;

said first head assembly including first and second magnetic transducer heads having respective transducer gaps of opposite azimuth angle, and third and fourth magnetic transducer heads having respective transducer gaps of opposite azimuth angle to said first and second heads respectively;

said second head assembly including fifth and sixth magnetic transducer heads having respective transducer gaps of opposite azimuth angle, and seventh and eighth magnetic transducer heads having respective transducer gaps of opposite azimuth angle to said fifth and sixth heads respectively; and tape guide means to wrap a magnetic tape more than 180° around said drum;

in recording operations said first head assembly through said first and second heads and said second head assembly through said fifth and sixth heads alternatively recording pairs of skew tracks on said tape such that said tracks alternate in azimuth angle, and each of said first, second, fifth and sixth heads recording video data in a said track for not more than 180° of each complete rotation of the drum and further data in said track for some further part of each complete rotation of the drum, said further part lying wholly beyond said video data;

means to derive respective reproduced signals from all said heads;

multiplexer means to distribute said reproduced signals to four output channels; and control means to control said multiplexer means in dependence on a selected reproduction mode;

in a normal reproduction mode said control means controlling said multiplexer means to distribute the reproduced signals comprising said video and further data from said first, second, fifth and sixth heads to said four channels respectively;

in a slow shuttle mode said control means controlling said multiplexer means to distribute the reproduced signals comprising only said video data from said first or second, said third or fourth, said fifth or sixth and said seventh or eighth heads to said four channels respectively during the intervals when one only of said head assemblies is reading said video data, and during intervals when one of said head assemblies is reading said video data and the other of said head assemblies in reading said further data, said control means controlling said multiplexer means to pass the reproduced said video data from said one head assembly to two of said channels and to pass the reproduced said further data from said other head assembly to the other two of said channels; and in a fast shuttle mode said control means controlling said multiplexer means to distribute the reproduced signals comprising said video data only from said first or second, said third or fourth, said fifth or sixth and said seventh or eighth heads to said four channels respectively.

2. An arrangement according to claim 1 wherein in said slow shuttle mode, during said intervals when one of said head assemblies is reading said video data and the other of said head assemblies in reading said further data, said control means controls said multiplexer means to pass the reproduced said video data from those two of said heads of said one head assembly the azimuth angles of which match the azimuth angles of the tracks which at any instant are being reproduced by said one head assembly to said two channels, and to pass the reproduced said further data from those two of said heads of said other head assembly the azimuth angles of which match the azimuth angles of the tracks which at any instant are being reproduced by said other head assembly to said other two channels.

3. An arrangement according to claim 2 wherein said further data is vertical parity check data.

4. An arrangement according to claim 3 wherein said video tape recorder further includes means to derive a drum phase signal corresponding in phase to rotational intervals during which said video data is recorded and reproduced and means to derive a vertical parity check pulse signal coinciding in phase with rotational intervals during which said vertical parity check data is recorded and reproduced, said drum phase signal and said vertical parity check pulse gate signals being supplied to said control means.

5. An arrangement according to claim 2 wherein said azimuth matching is determined in dependence on the presence or absence of synchronizing signals in said reproduced data passed to said channels.

6. An arrangement according to claim 1 wherein said control means comprising a programmable read-only memory.

7. An arrangement according to claim 1 wherein in said recording operation each of said first, second, fifth and sixth heads additionally record audio data in said track for some still further part of each complete rotation of the drum, said still further part lying wholly beyond said further part occupied by said further data.

8. An arrangement according to claim 1 wherein said slow shuttle mode extends from a tape speed in the reverse direction of substantially twice the normal recording speed to a tape speed in the forward direction of approximately twice the normal recording speed.

* * * * *